US 6,685,550 B2

(12) United States Patent
Houtz et al.

(10) Patent No.: US 6,685,550 B2
(45) Date of Patent: *Feb. 3, 2004

(54) SYSTEM AND METHOD FOR CLEANING INTESTINES (75) Inventors: Ronn A. Houtz, Derby, KS (US); Matthew S. Osborn, Wichita, KS (US); Chris G. Bandur, Omaha, NE (US); Gene J. Beckermann, Omaha, NE (US)

(73) Assignee: Excel Corporation, Wichita, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/222,217

(22) Filed: Aug. 16, 2002

(65) Prior Publication Data

US 2003/0040267 A1 Feb. 27, 2003

Related U.S. Application Data (63) Continuation-in-part of application No. 09/932,365, filed on Aug. 17, 2001, now Pat. No. 6,468,145.

(51) Int. Cl.[7] ................................................. A22C 5/16
(52) U.S. Cl. ...................................................... 452/123
(58) Field of Search ............................ 452/32, 81, 114, 452/120, 123, 173

(56) References Cited

U.S. PATENT DOCUMENTS

| 38,888 A | | 6/1863 | Dortenbach | |
|---|---|---|---|---|
| 427,046 A | | 5/1890 | Cherriere | |
| 482,600 A | * | 9/1892 | Trips | 452/123 |
| 964,066 A | * | 7/1910 | Sprenkle | 33/398 |
| 1,038,912 A | | 9/1912 | Loerke | |
| 1,210,959 A | * | 1/1917 | Luer | 452/123 |
| 1,294,455 A | * | 2/1919 | Hardy | 452/123 |
| 1,302,194 A | * | 4/1919 | Mayer | 452/123 |
| 1,484,741 A | * | 2/1924 | Schonland, Jr. | 452/32 |
| 1,492,697 A | * | 5/1924 | Neuberth | 452/123 |
| 1,781,301 A | * | 11/1930 | Randall | 452/123 |
| 1,876,676 A | * | 9/1932 | Hill | 452/123 |
| 2,100,587 A | * | 11/1937 | Chalker | 118/105 |
| 2,119,311 A | * | 5/1938 | Biedermann | 452/123 |
| 2,526,449 A | * | 10/1950 | Arlow et al. | 452/123 |
| 2,641,020 A | | 6/1953 | Clemens et al. | |
| 2,701,386 A | * | 2/1955 | Strickler | 452/123 |
| 2,726,421 A | * | 12/1955 | Strickler | 452/123 |
| 2,795,817 A | * | 6/1957 | Dahlberg | 452/116 |
| 2,831,209 A | * | 4/1958 | Bergman et al. | 83/444 |
| 3,049,749 A | * | 8/1962 | Mayer et al. | 452/123 |
| 3,116,513 A | * | 1/1964 | Ine | 452/116 |
| 3,175,244 A | * | 3/1965 | Sharp et al. | 452/114 |
| 3,509,593 A | * | 5/1970 | De Moss | 452/123 |
| 4,063,331 A | | 12/1977 | O'Neal et al. | |
| 4,293,980 A | * | 10/1981 | Ward | 452/123 |
| 5,616,073 A | | 4/1997 | Curry et al. | |
| 5,820,453 A | * | 10/1998 | Burke | 452/123 |
| 6,083,096 A | * | 7/2000 | Carrillo | 452/123 |
| 6,315,654 B1 | * | 11/2001 | Levsen | 452/123 |

FOREIGN PATENT DOCUMENTS

DE          2 260 865          6/1974
DE          100 01 708 A1      7/2001

* cited by examiner

Primary Examiner—Thomas Price
(74) Attorney, Agent, or Firm—Dorsey & Whitney LLP (57) ABSTRACT The present invention is a system and method for cleaning the interior and exterior surfaces of an animal intestine. The system includes a carrier for holding and transporting sections of the intestine. The carrier is attached to a vertically-disposed wheel for rotating the carrier in a circular path. A spray assembly, located at a point above the wheel, is connected to a cleaning fluid supply and directs a spray of cleaning fluid at the exterior surface of the intestine. A supply tube, located at a point above the wheel, directs cleaning fluid into an interior of the intestine.

19 Claims, 7 Drawing Sheets

SYSTEM AND METHOD FOR CLEANING INTESTINES

CROSS-REFERENCE TO RELATED APPLICATION(S)

This application is a continuation-in-part of U.S. patent application Ser. No. 09/932,365, now U.S. Pat. No. 6,468, 145 entitled "System and Method For Cleaning Animal Intestines," filed Aug. 17, 2001, which is hereby incorporated by reference in its entirety.

BACKGROUND OF THE INVENTION

The present invention relates to a system and method for cleaning animal intestines. More particularly, it relates to a system for cleaning both the interior surface and the exterior surface of an extracted animal intestine using a washing action provided by a cleaning fluid.

In the slaughter of mammalian or red-meat animals, the primary meat and meat products are derived from the animal's skeletal muscles (i.e., those muscles that are attached to the skeleton and function to facilitate movement and support the weight of the animal). A number of other parts of the carcass are either consumed directly by people or used in the production of other foods. These portions of the carcass are often referred to as "offal." Various types of red-meat slaughter animals include beef or bovine (e.g., cattle, steers, heifers, cows, bulls, and buffalo), pork or porcine (e.g., sows, gilts, barrows, boars, and pigs), and ovine (e.g., sheep and lamb). Typical beef offal includes the stomach, heart, brains, tongue, liver, kidneys, intestines, and mesentery (the folds of the peritoneum that connect that intestines to the dorsal abdominal wall). Typical pork offal includes the liver, kidney, brains, head, and intestines. Also, the wall of the intestine, with the inner lining (commonly referred to as the "mucosa") removed, is used for packaging of sausages.

The present invention is directed to a system for cleaning the intestines, including both the small and large intestines, of these various red-meat slaughter animals, so that the intestines are suitable for human consumption. The intestine is a generally soft, tubular element, which extends from the stomach to the anus. The small intestines of various red-meat animals vary in length from about 15 feet to about 120 feet. The small intestines of cattle, for example, typically extend 80 feet to 120 feet, more typically from 100 feet to 110 feet, while the small intestines of hogs typically extend 15 feet to 18 feet. These animal intestines are generally extracted from the carcass of the dead animal during the slaughtering process. When extracted, the intestines generally remain attached to the mesentery and are disposed in a sinuous configuration. The intestines typically have connective tissue, fat tissue, and glands attached to an exterior surface, which must be removed prior to human consumption.

In a live red-meat animal, the intestines receive food (also referred to as "ingesta") from the stomach, which is passed along the length of the intestine so that nutritional components of the food can be absorbed into the animal's blood stream. The unabsorbed portion of the food is discharged from a distal end of the intestine as digesta or fecal matter. Intestines which are harvested from the carcasses of red-meat animals during slaughtering contain some amount of digesta or fecal matter, which must be removed prior to human consumption.

One common food product made from animal intestines is "chitterlings," which are made from hog intestines. Many devices for cleaning chitterlings are known in the prior art, including those disclosed in U.S. Pat. No. 3,509,593 to DeMoss and U.S. Pat. No. 5,820,453 to Burke. These devices operate by passing the chitterling over a tubular element having a nozzle for spraying water onto the interior surface to remove a portion of the fecal matter. In commercial cleaning operations, the chitterlings are then commonly slit longitudinally and cleaned further using a centrifugal or agitating washing action. Finally, the chitterlings are then commonly passed through a hand-cleaning and inspection station for further cleaning.

In Hispanic cultures, "tripas" are prepared from the small intestines of slaughtered red-meat animals. To make tripas more flavorful, it is advantageous to thoroughly clean the digesta and fecal matter from the intestine, yet keep the inner lining or mucosa of the intestine intact. In European and Hispanic cultures intestines are used for sausage skin or casing. In both of these applications, the intestines must be properly cleaned such that they are suitable for human consumption. A device for washing tripas is disclosed in U.S. Pat. No. 6,083,096 to Carrillo.

The prior art systems and methods for cleaning animal intestines are labor-intensive and require much human intervention. This slows the cleaning process to below commercial chain speeds in a meat processing facility. In addition, prior art systems often wash away the mucosa, along with the digesta and fecal matter, due to pressure of the washing system.

There is a need in the art for a system and method of removing ingesta and other undesirable particles from the surfaces of an animal intestines at commercial chain speeds (e.g., 300 head per hour or more). There is a further need in the art for a device capable of cleaning the animal intestines without causing structural damage to the intestine, including the inner lining or mucosa of the intestine.

BRIEF SUMMARY OF THE INVENTION

The present invention, in one embodiment, is a device for cleaning an inner surface and an outer surface of a section of an animal intestine. In this embodiment, the device includes a carrier for supporting at least one of the sections and providing a connection to the inner surface. The device further includes a track for guiding and supporting the carrier, the track configured in a closed-loop. The device includes at least one vertically disposed tube having a plurality of orifices for directing a fluid at the outer surface. At least one nozzle is located along the elevated portion of the track and is adapted to direct the fluid into the connection of the carrier.

The present invention, in another embodiment, is a method of cleaning an interior surface and an exterior surface of animal intestines. In this embodiment, the method includes attaching the animal intestines to a carrier adapted to guide the animal intestines along a track and to allow access to the interior surface. The method includes elevating the carrier until the animal intestines hang vertically above ground level and impinging a spray of cleaning fluid onto the exterior surface of the plurality of animal intestines. The method also includes introducing a flow of cleaning fluid into the interior surface of the plurality of animal intestines through the carrier.

The present invention, in a subsequent embodiment, is a rotating device for cleaning an inner surface and an outer surface of a section of an animal intestine. In this embodiment, the device includes an intestine washing wheel for carrying sections of intestine through a washing station.

The intestine washing wheel sits in a vertical or substantially vertical position and rotates clockwise. The intestine washing wheel includes multiple nozzles, each nozzle located on the end of a nozzle-support arm, where multiple nozzle-support arms protrude radially from an axis on the intestine washing wheel. The device further includes a load station, a wash station, a release station, and a nozzle cleaning station, such that the intestine washing wheel rotates (or indexes) each section of intestine through each station.

The present invention, in an additional embodiment, is a method of cleaning an interior surface and an exterior surface of animal intestines using a rotating cleaning system. In this embodiment, the method includes attaching a section of animal intestines to the nozzle on the intestine washing wheel. The method includes rotating the washing wheel such that each section of intestine is carried to the wash station, where water or cleaning fluid is introduced into the interior surface of the intestine. The method also includes projecting water or cleaning fluid over the exterior of the intestine. The washing wheel then rotates again, where the method further includes releasing the intestine at the release station and cleaning the nozzle at the nozzle cleaning station.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
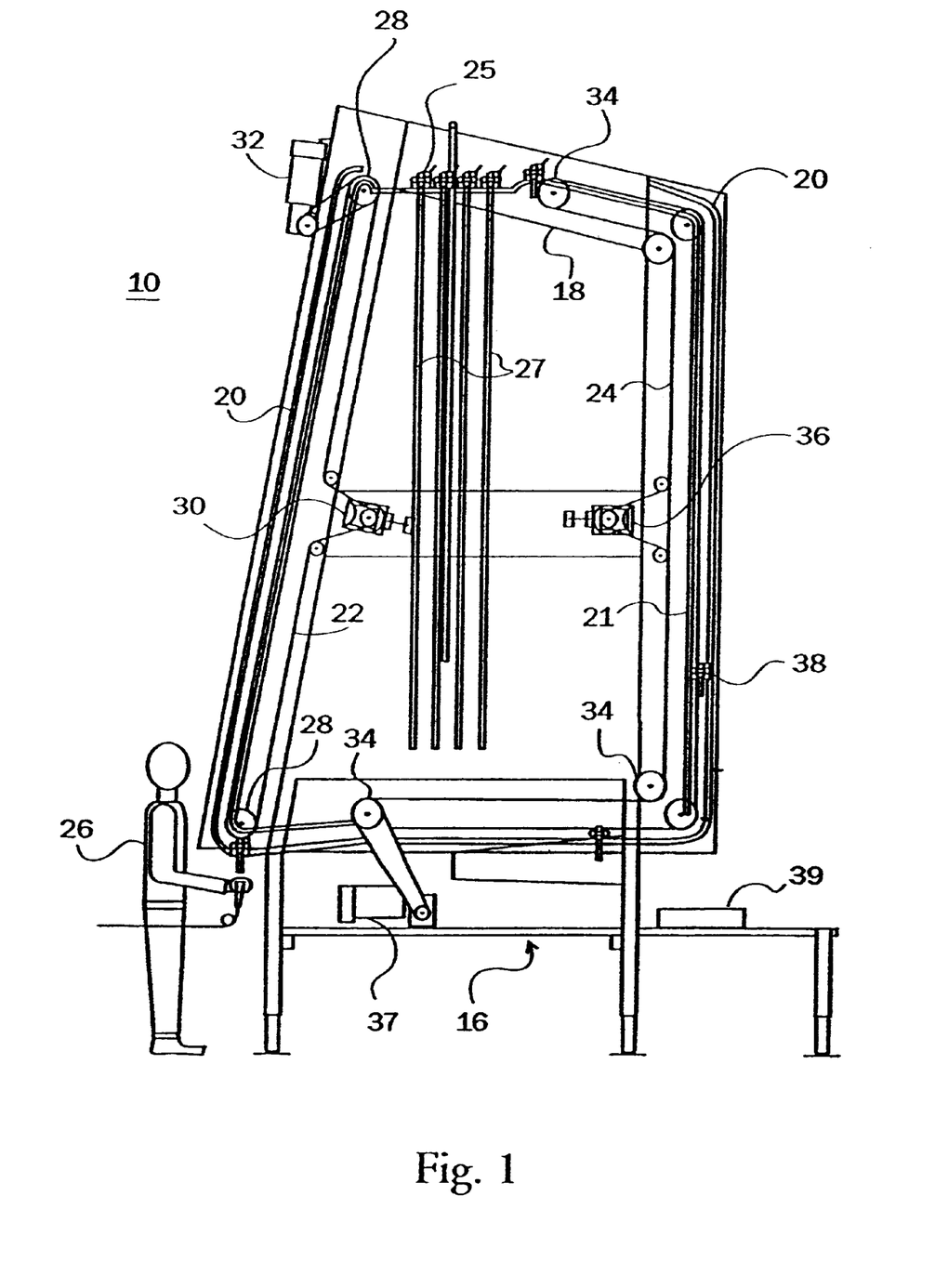
FIG. 1 is a side view of an intestine washing system according to one embodiment of the present invention.

FIG. 1 shows a side view of an intestine washing system 10 according to one embodiment of the present invention. As shown in FIG. 1, the system 10 includes a base 16, a frame assembly 18, an outer track 20, an inner track 21, a lift drive chain 22, a return drive chain 24, and a carrier 25. As shown in FIG. 1, the base 16 is connected to and supports the frame assembly 18 above ground level. In one embodiment, the base 16 supports the frame assembly 18 at a level of 3 to 4 feet off the ground for the convenience of an operator 26, who must connect intestine sections or product 27 to the trolley or carrier 25. The frame assembly 18, in one embodiment, is constructed from steel, although structural members of any type can be used.

The frame assembly 18 supports the outer track 20 and the inner track 21, which together define a closed travel path of the carrier 25. In one embodiment, the outer track 20 and the inner track 21 are constructed from metal rods, such as steel. The outer track 20 and the inner track 21 are generally coplanar and maintain a constant spacing or separation adapted to support the carrier 25, as further discussed below.

The lift drive chain 22 is attached to the frame assembly 18 by a set of sprockets or drive plates 28. The tension in the lift drive chain 22 is adjustable by the tension assembly 30, and the lift drive train 22 is driven by an electric lift motor 32. In the embodiment illustrated in FIG. 1, the electric lift motor 32 is mounted to the frame assembly 18. The return drive chain 24 is also connected to the frame assembly 18 through sprockets or drive plates 34. The tension in the return drive chain 24 is adjustable by the tension assembly 36, and the return drive chain 24 is driven by an electric return motor 37. In the embodiment illustrated in FIG. 1, the electric return motor 37 is mounted to the base 16 of the intestine cleaning system 10.

A release mechanism 38 is located along the return drive chain 24, as shown on the right-hand side of FIG. 1. The release mechanism 38 operates to release product 27, after it has been cleaned. The lift drive chain 22 and the return drive chain 24 function to drive the carrier 25 along the travel path defined by the outer track 20 and the inner track 21. A container 39, supported by the base 16, is located near a vertically descending portion of the tracks 20, 21 (shown near the right-hand side of FIG. 1) for collection of the product after it has been cleaned.

Figure 2A:
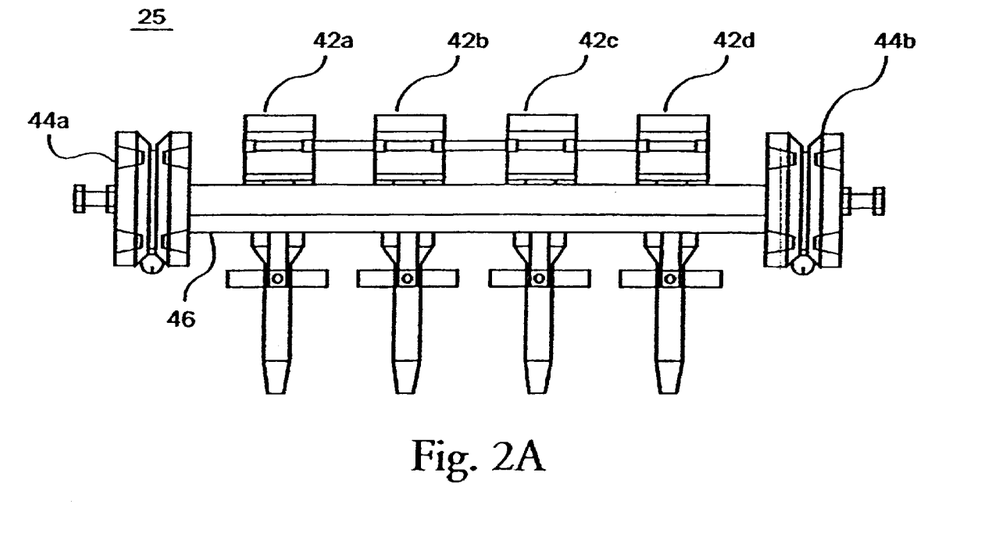
FIG. 2A is a sectional view of a nozzle assembly of the carrier of FIG. 2B, according to one embodiment of the present invention

FIG. 2A is a front view of the carrier 25, according to one embodiment of the present invention. As shown in FIG. 2A, the carrier 25 includes a set of nozzle assemblies 42a, 42b, 42c, 42d. While the embodiment shown in FIG. 2A includes four nozzle assemblies 42, other embodiments may include any number of such nozzle assemblies, including fewer nozzle assemblies 42 and more nozzle assemblies 42. As further shown in FIG. 2A, the carrier 25 includes wheels 44a, 44b and a carrier body 46. The nozzle assemblies 42 are connected to and pass through the carrier body 46. The carrier body 46 is rotatably coupled to the wheels 44a and 44b, such that the nozzle assemblies 42 remain oriented perpendicular to the ground, while the carrier 25 traverses the tracks 20, 21. In other words, the body 46 of the carrier 25 is free to pivot with respect to the wheels 44a and 44b of the carrier 25. In the embodiment shown in FIG. 2A, the wheels 44a and 44b include generally central V-shaped grooves adapted to mate with the rods of the outer track 20 and the inner track 21. In one embodiment, the wheels 44a, 44b are polymer wheels, as known in the art, which do not require lubrication.

Figure 2B:
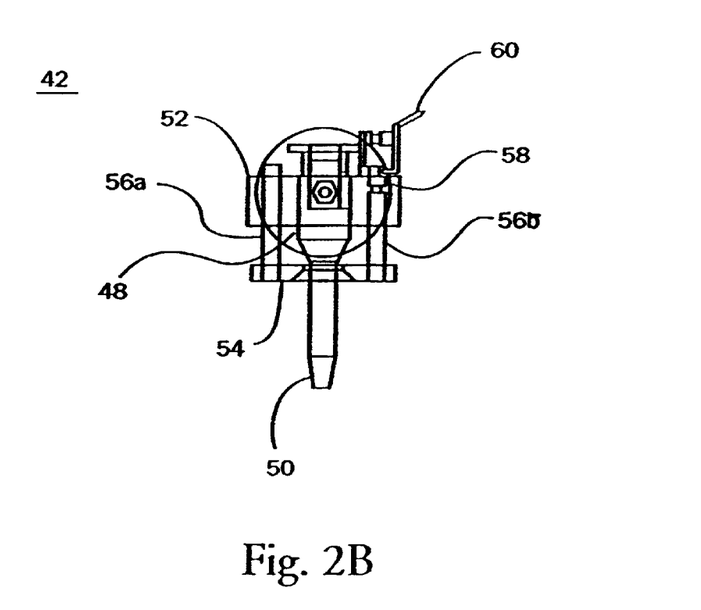
FIG. 2B is a front view of a carrier, for use with the intestine washing system, according to one embodiment of the present invention.

FIG. 2B is a sectional view of one of the nozzle assemblies 42. As shown in FIG. 2B, the nozzle assembly 42 includes a cylindrical nozzle 48, having a tapered distal tip 50. The cylindrical nozzle 48 is mounted to and passes through a body 52. The nozzle assembly 42 further includes an annular ring 54 coupled to the body 52 by support cylinders 56a and 56b. Cylinder 56b includes a notch 58 for receiving a latch 60. The support cylinders 56a, 56b are spring-loaded such that they are biased in a downward direction (toward the tapered distal tip 50). As illustrated in FIG. 2B, the annular ring 54 includes a tapered aperture through its center. The aperture is tapered such that it is wider on a face closer to the tapered distal tip, and narrower on a face closer to the body 52. This taper feature facilitates passage of the product 27 through the aperture, which can then be locked in place, as further described below.

Figure 3:
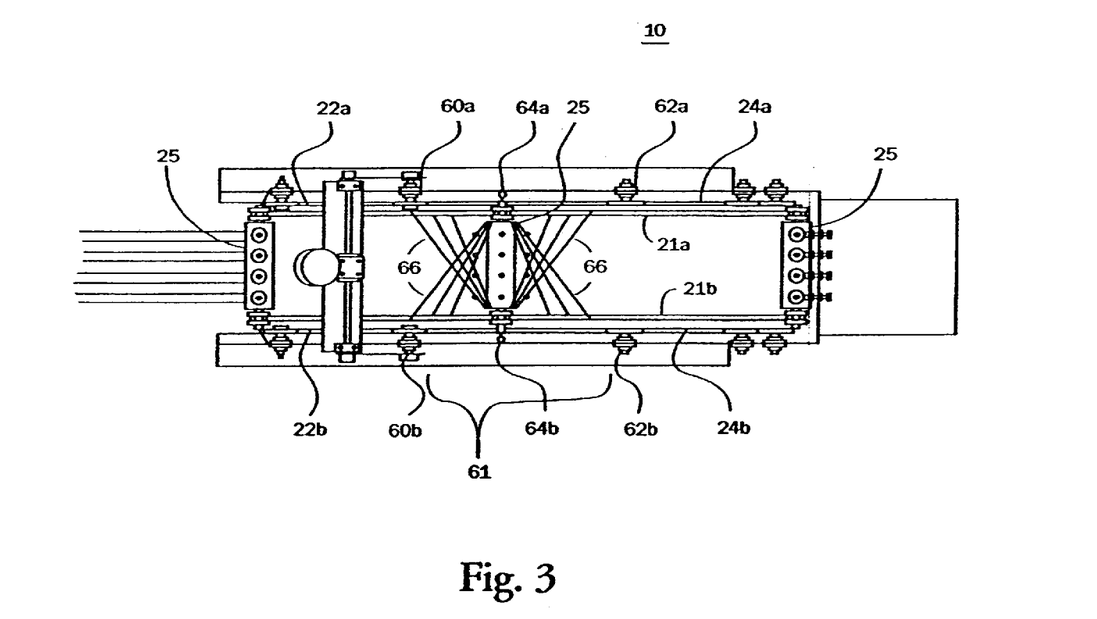
FIG. 3 is a top view of a top section of the intestine washing system, shown in FIG. 1, according to one embodiment of the present invention.

FIG. 3 shows a top view of a top portion of the intestine washing system 10 according to one embodiment of the present invention. As shown in FIG. 3, the system 10 generally includes two sets of components disposed in generally parallel planes for supporting and driving the carrier 25. In the top portion of the system 10, the support and guiding of the carrier 25 is performed by the inner track 21 (further illustrated near the top of FIG. 1).

As shown on the left-hand side of FIG. 3, the lift drive chain 22 includes a rear lift drive chain 22*a* and a front lift drive chain 22*b* for driving a first end and a second end of the carrier 25. The lift drive chains 22*a*, 22*b* are disposed in generally parallel planes. In another embodiment of the present invention, only one lift drive chain 22 is employed. The lift drive chains 22*a*, 22*b* terminate at the corresponding sprockets or drive plates 60*a* and 60*b*. As also shown in FIG. 3, the inner track 21 includes a rear inner track 21*a* and a front inner track 21*b* for supporting the first wheel 44*a* and the second wheel 44*b* of the carrier 25 as it travels along the top portion of the intestine washing system 10. As shown near the center of FIG. 3, the top portion includes a free trolley section 61 where the carrier is supported and guided by the inner tracks 21*a*, 21*b*, but is not driven. As shown near the right-hand side of FIG. 3, the top portion includes a portion of the return drive chain 24, which includes a rear return drive chain 24*a* and front return drive chain 24*b* disposed in generally parallel planes. The return drive chain 24 originates at drive plates 62*a* and 62*b*. The free trolley section 61 extends from the drive plates 60*a*, 60*b* to the drive plates 62*a*, 62*b*.

FIG. 3 also shows a top view of fluid supply pipes 64*a* and 64*b*. The fluid supply pipes 64*a*, 64*b* extend generally downward from the inner tracks 21*a*, 2*ab* in a direction substantially perpendicular to the plane of travel of the carrier 25. The fluid supply pipes 64*a*, 64*b* include a plurality of generally equally spaced nozzles along their length. The nozzles are configures to generate the spray pattern 66 shown in FIG. 3, which acts to clean an exterior surface of product, as explained in greater detail below. In one embodiment of the present invention, the fluid supply pipes 64*a*, 64*b* supply water to perform cleaning of the outer surface of the product 27. In other embodiments, other cleaning fluids known to those of skill in the art are used to perform the cleaning operation.

During operation of the intestine washing system 10 (shown in FIG. 1), the operator 26 takes a section of product 27 and slides it over the tapered distal tip 50 of the nozzle 48, through the tapered aperture of the ring (shown in FIG. 2). The tapered aperture is wider at a proximal face (closer to the tapered distal tip 50) and narrows as it moves toward a distal face. This taper facilitates insertion of the product 27. Once the product 27 is inserted through the aperture, the operator 26 pushes up the annular ring 54, along the support cylinders 56*a*, 56*b*, until the latch 60 engages the notch 58, thereby securing the annular ring 54 in place. At this point, the product 27 is secured in place between the annular ring 54 and the tapered aperture of the nozzle 48. The operator then repeats this process for each of the nozzles 42*a*, 42*b*, 42*c*, 42*d*, such that four sections of product 27 are connected to the carrier 25.

Once all sections of product are attached to the carrier 25, the operator 26 moves the carrier 25 forward along the tracks 20, 21 until it engages the lift drive chain 22. The lift drive chain 22 then raises the sections of product 27 to the top of the intestine cleaning system 10 (the area shown in FIG. 3), where the carrier 25 is released from the lift drive chain 22 onto a proximal end of the free trolley section 61.

In one embodiment of the present invention, the product 27 is pre-cut prior to introduction to the intestine washing system 10, using one of the techniques known in the art. In another embodiment of the present invention, the product 27 is not pre-cut, but instead cutting is performed by the intestine cleaning machine, when the carrier 25 reaches an appropriate height.

The carrier 25 will remain in a position adjacent to the distal end of the lift drive chain 22 until a second carrier 25 reaches the top of the intestine cleaning system 10 and indexes the carrier 25 one position forward (toward the right, as shown in FIG. 1). Each successive carrier 25 reaching the top portion entering the free trolley section 63 will index the prior carriers 25 further down the tracks 21*a*, 21*b* of the free trolley section 63.

While positioned at the top of the intestine cleaning system 10, as shown in FIG. 3, the carrier 25 is supported by the inner tracks 21*a*, 21*b*, and it spans the distance between the tracks such that the sections of the intestine hang down generally perpendicular to the tracks 21*a*, 21*b*. As the carrier 25 moves along the free trolley section 61, its exterior surface is cleaned by a spray of cleaning fluid 66, from the fluid supply pipes 64*a*, 64*b*, impinging on the exterior surface. The spray of fluid, according to one embodiment of the present invention, is shown in FIG. 3. As the carrier 25 progresses along the free trolley section 61, the fluid spray 66 impinges upon different portions of the exterior surface of the product 27 so that, by the time the carrier 25 has completely traversed the free trolley section 61, the exterior surface will be free of fecal matter and other contaminants. In one embodiment of the present invention, the fluid supply pipes 64*a*, 64*b* carry water charged to a pressure of about 60 to about 80 psi. In one embodiment, the fluid supply pipes 64*a*, 64*b* include nozzles adapted to spray fluid, in a fan at angles of about 15 to about 60 degrees from a line extending between the pipes, as shown in FIG. 3. In one embodiment the intestine cleaning system 10 includes controls to regulate the pressure of the fluid in the fluid supply pipes 64*a*, 64*b*.

At one point along the free trolley section 61, the nozzle assemblies 42*a*, 42*b*, 42*c*, 42*d* of the carrier 25 align with corresponding fluid supply nozzles located above the tracks 21*a*, 21*b* along the free trolley section 61. At this point, the cleaning fluid is introduced into the interior of the sections of product 27 through the nozzles 48 in the nozzle assemblies 42*a*, 42*b*, 42*c*, 42*d* by injecting the fluid into the orifices located at the tops of the nozzles 48. The cleaning fluid is then driven by gravitational forces through an interior lumen of the sections of product 27 and will discharge out a distal end of the sections into a collection trough below, where it can be disposed of properly. This cleaning fluid will scrub interior walls of the sections of intestine and remove any digesta and fecal matter therein. This waste material will travel with the cleaning fluid into the collection trough below for disposal. In one embodiment of the present invention, the fluid supply nozzles supply a free flow of water for about 8 to about 16 seconds. In another embodiment, water is allowed to flow through the interior lumen of the product 27 until the water is exiting the product 27 appears clear.

Once the carrier 25 reaches the distal end of the free trolley section 63, it is engaged by the return drive chains 24a, 24b, and is guided by the outer track 20 and the inner track 21 in a generally downward direction. As the carrier 25 travels downward, the product 27 enters the container 39, so that it can be removed for further processing or packaged. When the carrier 25 reaches the release mechanism 38, the release mechanism 38 contacts and manipulates the latch 60, which releases the support cylinders 56a, 56b. This, in turn, releases the rings 54 of the nozzle assemblies 42a, 42b, 42c, 42d. The rings 54 are then driven downward by the spring action, thereby releasing the sections of product 27. In one embodiment, this release point is located about 3 feet above the container 39.

In one embodiment, the container 39 is a stationary container or tray that accepts the clean product 27. In another embodiment, the contained 39 is mounted on an oscillating driver so that the product 27 is placed into the container 39 in a serpentine fashion. This places the product 27 in a configuration suitable for directly packaging for sale to the consumer.

When the carrier 25 reaches a bottom of the outer track 20, the outer track 20 guides the carrier 25 along a lower section of the intestine cleaning system 10 back toward the operator 26. In one embodiment, the lower section of the system 10 includes a carrier cleaning system for removing any contamination from the carrier 25. In one embodiment, the carrier cleaning system is comprised of one or more nozzles for spraying a cleaning fluid onto the carrier as it travels along the bottom section. In one embodiment, the cleaning fluid is the same cleaning fluid used to clean the product 27. In another embodiment, a more powerful cleaning fluid (such as a bleach) is used, followed by a water rinse of the carrier 25.

Once the carrier 25 reaches the end of the release drive chain 24, carrier 25 is released onto a free load section, where it awaits loading by the operator 26. At this point, the carrier 25 has completed a full loop through the intestine cleaning system 10, has been cleaned of contaminants, and is ready to complete a second cycle.

The system 10 of the present invention, in one embodiment, operates at a rate sufficient to clean sections of small intestines at typical commercial chain speeds of a meat processing facility. In one embodiment, the system 10 can keep pace with a meat processing line operating at about 300 head per hour. In one embodiment, two or more of the systems 10 are operated in parallel to provide each operator 26 with additional time to attach sections of product 27 to the carrier 25.

Figure 4:
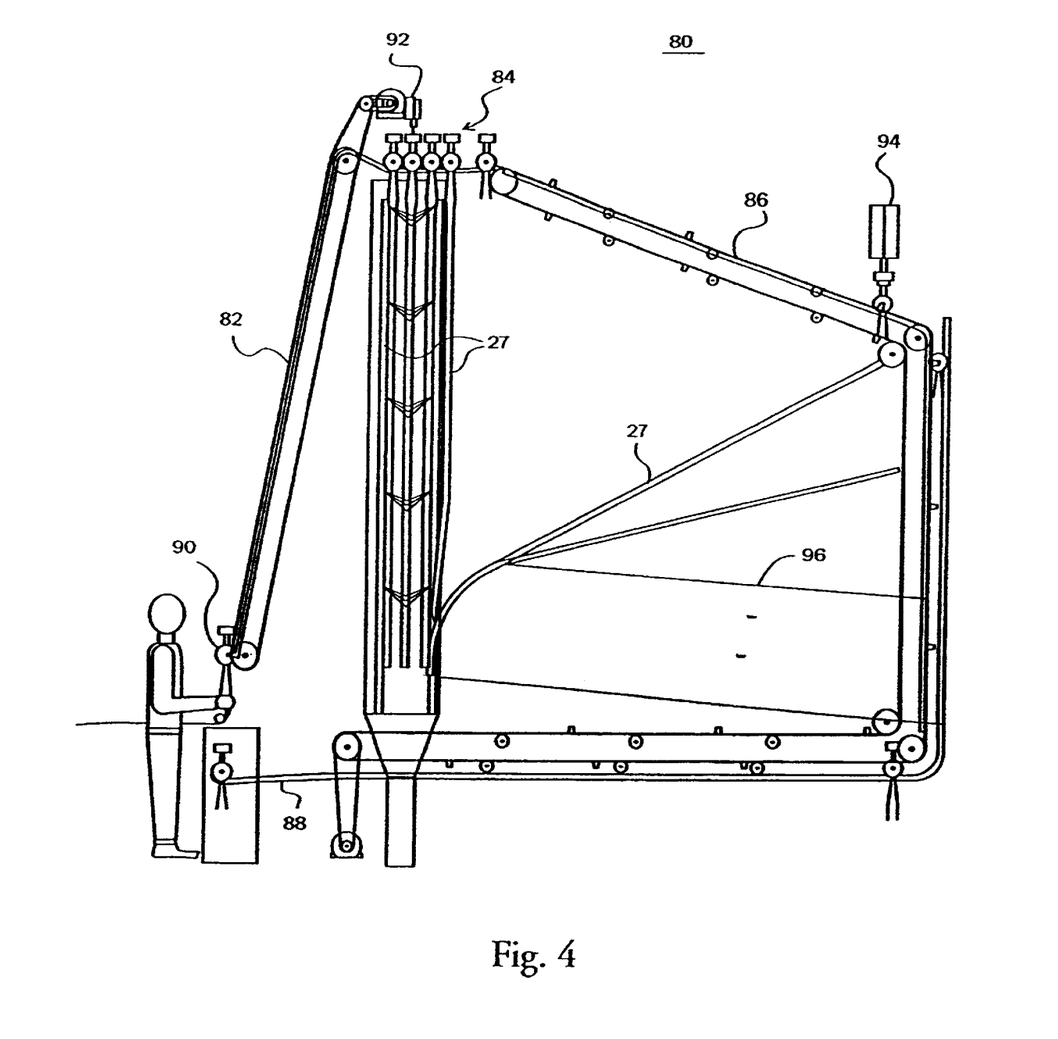
FIG. 4 is a side view of an intestine washing system according to a second embodiment of the present invention.

FIG. 4 is a side view of an intestine cleaning system 80 according to a second embodiment of the present invention. As shown in FIG. 4, the intestine cleaning system 80 includes lift drive chain section 82, a free trolley section 84, a return drive chain section 86, and a carrier collection section 88. The intestine cleaning system 80 further includes a carrier 90, a fluid injector 92, and a carrier release 94. Each of the sections 82, 84, and 86 are connected to a pair of continuous tracks that support wheels of the carrier. The intestine cleaning system 80 shown in FIG. 4 differs from the intestine cleaning system 10 shown in FIG. 1 in three main aspects. First, the intestine cleaning system 80 is designed for operation with a carrier adapted to carry only one intestine section (shown in FIG. 5). Second, the system 80 includes a collection tray 96 for gently laying down the intestine sections after cleaning. Third, the system 80 includes four fluid-cleaning tubes and corresponding sets of fluid spray nozzles, as shown in FIG. 5.

Figure 5:
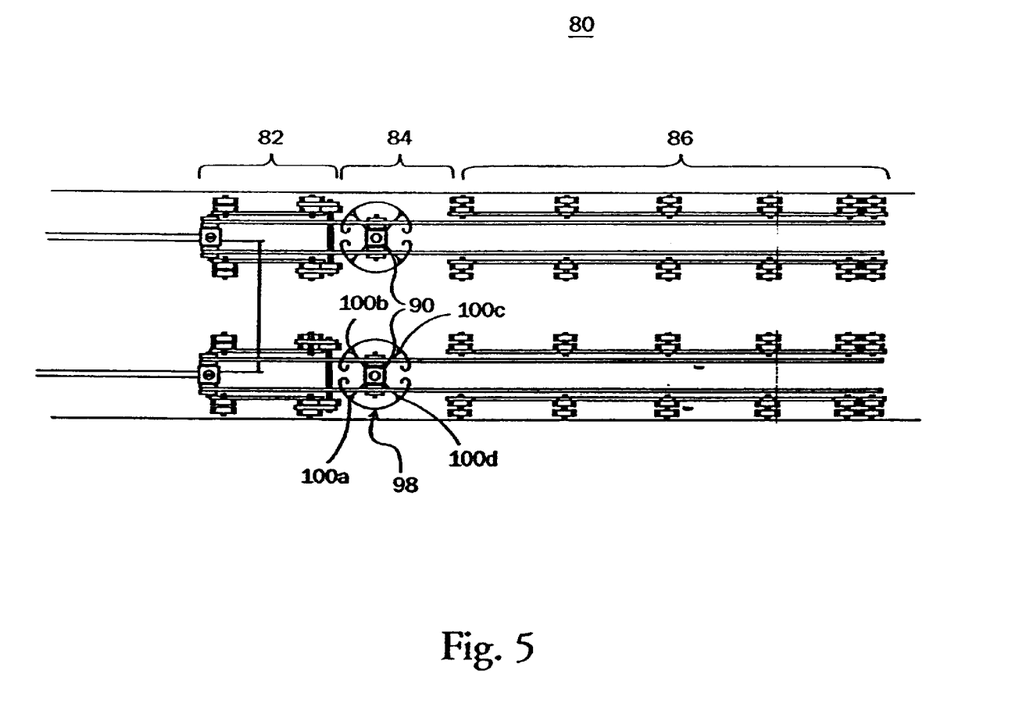
FIG. 5 is a top view of a top section of the intestine washing system, shown in FIG. 4, according to one embodiment of the present invention.

FIG. 5 shows a top view of the intestine-cleaning system 80, according to one embodiment of the present invention.

The embodiment shown in FIG. 5 includes two parallel sets of tracks for guiding two carriers 90 in parallel. In other embodiments of the present invention, more tracks may be set up in parallel to carry more of the carriers 90. FIG. 5 also shows an exterior cleaning system 98 according to one embodiment of the present invention. As shown in FIG. 5, the exterior cleaning system 98 includes four water supply pipes 100a, 100b, 100c, 100d. Each of the water supply pipes 100a, 100b, 100c, 100d includes a plurality of spray nozzles located along its length and directed towards a center point of the cleaning system 98.

During operation of the intestine cleaning system 80, the operator selects a length of intestine and attaches it to the carrier 90. The carrier 90 includes expandable jaws which engage an interior of the intestine and are released to expand and secure the section of intestine to the carrier 90. The operator then places the carrier 90 onto the lift drive chain 82 and repeats this process of the carrier 90 on the parallel system. The carrier 90, along with the intestine section, is transported to a top of the intestine cleaning system 80. When the carrier 90 reaches a distal end of the lift drive chain 82, the carrier 90 moves onto the free trolley section 84. The carrier 90 is moved along the free trolley section 84 when the next carrier 90 reaches the top of the lift drive chain 82.

As the carrier 90 moves from a proximal end to a distal end of the free trolley section 84, the carrier 90 passes through the cleaning system 98, as shown in FIG. 5. As the carrier 90 moves through the cleaning system 98, it is sprayed with cleaning fluid from the fluid supply pies 100a, 100b, 100c, 100d. Also, when the carrier 90 reaches the position along the free trolley section 84 where the nozzle injector 92 is located, water is introduced into an interior of the intestine section through an orifice in the carrier 90. Cleaning fluid is allowed to pass through the interior surface of the intestine section until substantially all digesta and fecal matter is removed from the interior of the intestine. When the carrier 90 reaches a distal end of the free trolley section 84, it engages the return drive chain 86, and it begins a gradual descent.

As the carrier 90 descends along the return drive chain 86, the intestine section is laid down on the tray 96. When the carrier 90 reaches the release mechanism 94, the intestine section is released from the carrier 90 and falls onto the tray 96. As shown in FIG. 4, the initial segment of the return drive chain 86 has a relatively shallow slope and the tray 96 is rounded at a proximal end, such that the intestine section is laid down gently in a substantially extended configuration. The carrier 90 then travels along to the distal end of the return drive chain 86, where it is cleaned for further use, and is placed on the carrier accumulator 88, where it becomes available to the operator. Next, the intestine sections located on the collection trough 96 may be subjected to further processing or removed to a packaging area to be packaged.

In one embodiment of the present invention, the intestine-cleaning system 10 includes a release switch. In this embodiment, the operator causes the lift drive chain 22 to engage the carrier 25 by pressing the release button. In one embodiment, the release switch is placed near the operator's knee and is adapted to be activated by the operator's knee. This design allows the operator 26 to have control over when the carrier 25 engages the lift drive chain 22.

Both of the intestine cleaning systems 10, 80 disclosed are capable of cleaning intestine sections at a sufficient rate to keep pace with a typical meat processing assembly line operating at about 300 head per hour. The specific rate of the systems 10, 80 will depend on the number of sections cleaned at one time and the rates at which the operator is able to properly mount intestine sections to the carrier.

Figure 6:
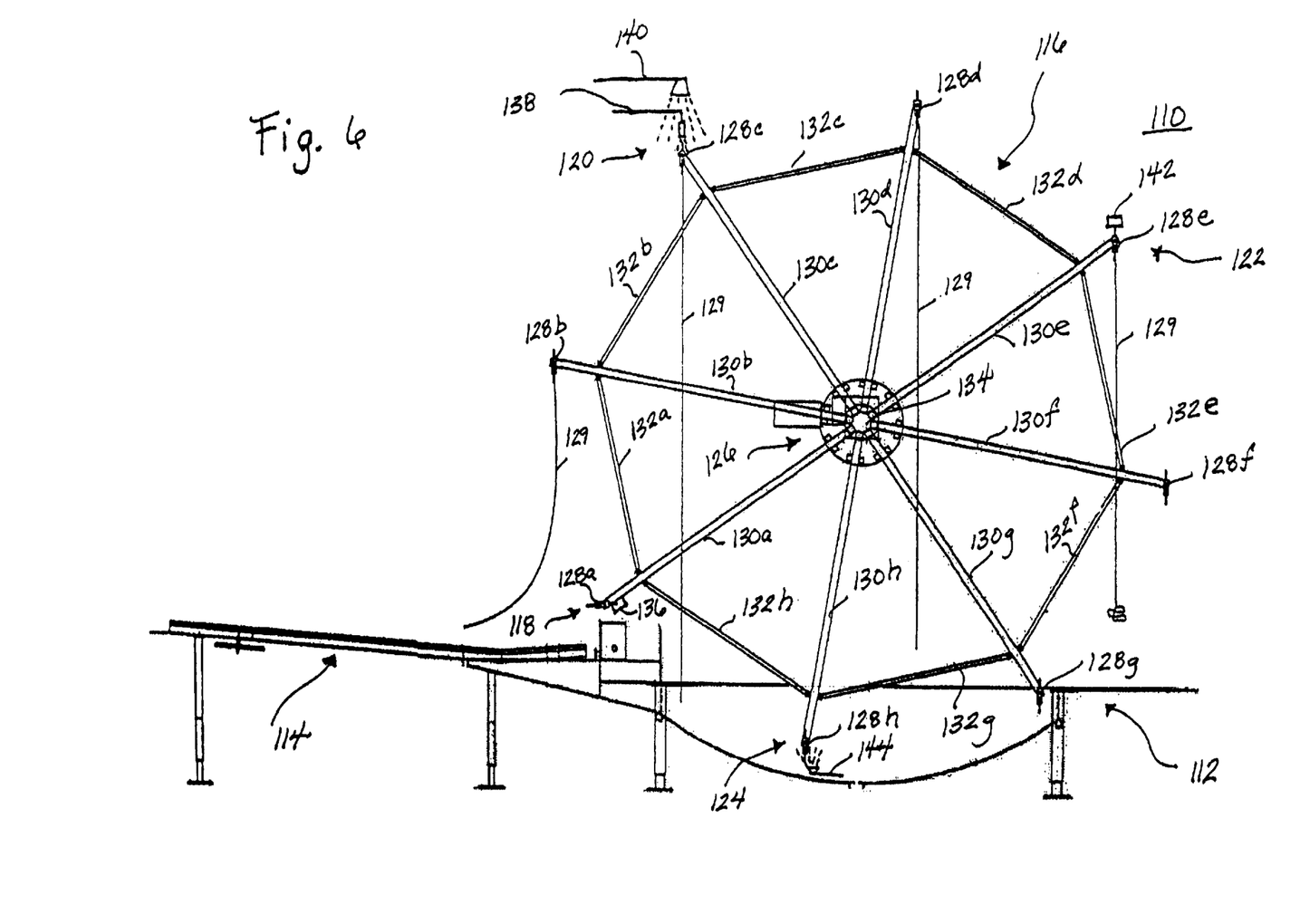
FIG. 6 is a side view of a rotating intestine washing system, according to one embodiment of the present invention.

FIG. 6 shows a side view of a rotating intestine washing system 110 according to one embodiment of the present invention. As shown in FIG. 6, the system 110 includes a base 112, a loading table 114, an intestine washing wheel 116, a load station 118, a wash station 120, a release station 122, and a nozzle cleaning station 124. The base 112 is connected to the loading table 114. The base 112 is also connected to and supports the intestine washing wheel 116 above ground level in a vertical position. In one embodiment, the base 112 supports the intestine washing wheel 116 at a level of 3 to 4 feet off the ground for the convenience of an operator loading intestine sections onto the washing wheel 116. The loading table 114 and the intestine washing wheel 116, in one embodiment, are constructed from steel, although structural members of any type may be used.

The intestine washing wheel 116 includes a motor and gear system 126, a plurality of carriers or nozzle assemblies 128a–h, a plurality of nozzle-support arms 130a–h, and a plurality of support brackets 132a–h. The intestine washing wheel 116 has a circular configuration, wherein the washing wheel 116 rotates about an axis 134. In the embodiment shown in FIG. 6, the intestine washing wheel 116 rotates in a clockwise direction, but the wheel 116 may also rotate in a counter-clockwise direction. In one embodiment, the intestine washing wheel 116 sits in a substantially vertical position. In one embodiment the wheel 116 is angled slightly from the vertical position, such that the wheel 116 allows sections of intestine to fall vertically from the washing wheel 116 without touching the lower portion of the wheel 116 or becoming tangled with other sections of intestine.

The motor and gear system 126 is located at the axis 134 of the intestine washing wheel 116 and is used to drive or rotate the washing wheel 116 about the axis 134. The motor and gear system 126 rotates the washing wheel 116 incrementally to each station of the rotating intestine washing system 110.

The intestine washing wheel 116 resembles the radial arm system of a ferris wheel, such that each of the nozzle-support arms 130 protrude or radiate at 90 degree angles from the axis 134 and, in one embodiment, are spaced equal distance apart. One of the plurality of nozzle assemblies 128 is attached to one of the plurality of nozzle-support arms 130 at a distal end from the axis 134, such that the intestine washing wheel 116 includes multiple combinations of the nozzle assembly 128 and the nozzle-support arm 130. The nozzle-support arms 130 are reinforced by the support brackets 132, such that the support brackets 132 reinforce one or more of the nozzle-support arms 130. In the embodiment shown in FIG. 6, the intestine washing wheel 116 includes a combination of eight nozzle assemblies 128 and eight nozzle-support bars 130, however, other embodiments may include any number of nozzle assembles 128 and nozzle-support bars 130. Accordingly, the number of support brackets 132 used to reinforce the nozzle-support arms 130 may also vary based on the number of nozzle-support arms 130.

The loading station 118, in one embodiment, is located at the end of the loading table 114 near the intestine washing wheel 116. The loading station 118 includes a loading cylinder assembly 136. The loading cylinder assembly 136 is used in conjunction with the nozzle assembly 128 to load a section of intestine product 129 onto the carrier or nozzle assembly 128. When the loading cylinder assembly 136 is activated, it applies pressure to the nozzle assembly 128 and releases a clamping mechanism on the nozzle 128. This allows an operator to load the intestine product 129 onto the nozzle assembly 128. Once the loading cylinder assembly 136 is no longer activated, the clamping mechanism secures the intestine product 129 to the nozzle assembly 128, as explained and shown in further detail below. Once the intestine 129 is secured to the nozzle assembly 128, the intestine washing wheel 116 rotates to allow the next section of intestine 129 to be attached to a subsequent nozzle assembly 128.

The washing station 120 is located at the top of the intestine washing wheel 116. In the embodiment shown in FIG. 6, the washing station is located at a point just before the top or upper-most point of the intestine washing wheel 116, but the washing station 120 may be located at any point on the wheel 116. The washing station 120 includes a supply pipe 138 and an external spray assembly 140. Although not shown, the supply pipe 138 and external spray assembly 140 may be mounted to an external frame or the frame of the intestine washing wheel 116.

As further shown in FIG. 6, both the supply pipe 138 and external spray assembly 140 are directly aligned above the nozzle assembly 128. In one embodiment, the supply pipe 138 is located directly above the nozzle assembly 128, and the external spray assembly 140 is located directly above the supply pipe 138. This allows water to flow directly from the supply pipe 138 into an opening on the nozzle assembly 128 and through the attached intestine product 128. Likewise, the external spray assembly 140 sprays water over the exterior of the intestine product 129. In other embodiments, the external spray assembly 140 may include multiple spray nozzles that are located at various vertical points along the exterior of the intestine product. In one embodiment, for example, additional external spray nozzles are located at points along the two following nozzle-support arms 130 coinciding with the location of the vertically-hanging intestine product 129, when the wheel 116 is stopped at the washing station 120.

The release station 122 is located at a point after the washing station 120, preferably after water or a cleaning fluid has had sufficient time to flow through the interior of the intestine product 129. The release station includes a release cylinder 142. The release cylinder 142 is used to release the intestine product 129 from the nozzle assembly 128. The cleaning station 124 is located after the release station 122 and is used to clean the nozzle assembly 128 before a new section of intestine product 129 is loaded. The cleaning station 124 includes a cleaning spray assembly 144. In one embodiment, the cleaning spray assembly 144 is located at a position below the nozzle assembly 128, but the cleaning spray assembly may be located at any point that allows it to effectively clean the nozzle assembly 128.

Figure 7:
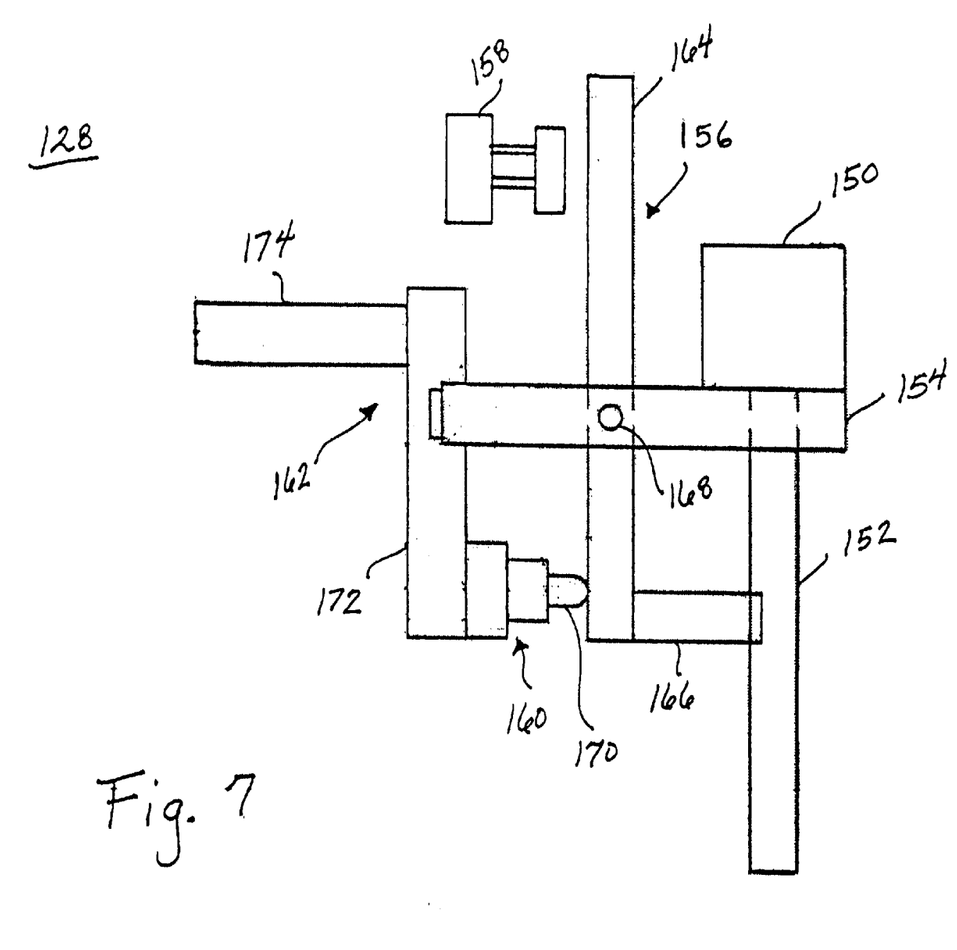
FIG. 7 is a front view of a nozzle assembly, for use with the rotating intestine washing system, according to one embodiment of the present invention.

FIG. 7 shows a front view of one of the nozzle assemblies 128 of FIG. 6. The nozzle assembly 128 includes a funnel 150, a cylindrical tube 152, a pivot arm 154, a clamp 156, an air cylinder 158, a contact mechanism 160, and an attachment bracket 162. The funnel 150, in one embodiment, is made of one and a half inch metal tubing. The funnel 150 is attached to and vertically aligned with the cylindrical tube 152 to allow water or cleaning fluid to enter funnel 150 and flow through cylindrical tube 152. The cylindrical tube, in one embodiment, is made of half inch metal tubing. Both the funnel 150 and cylindrical tube 152 are attached to and supported by pivot arm 154. The funnel 150 is attached to the top of the pivot arm 154, and the cylindrical tube 152 is attached to the bottom of the pivot arm 154. An opening in the pivot arm 154 allows funnel 150 and cylindrical tube 152 to be directly connected such that water or cleaning fluid may flow from funnel 150 to cylindrical tube 152. The intestine product 129 is slid over and attached to the exterior surface of the he cylindrical tube 152, thus once water or fluid enters the cylindrical tube 152, it continues to flow through the interior of the intestine product 129.

The clamp 156 is attached to the pivot arm 154. The clamp 156 includes vertical arm 164, horizontal arm 166, and pivot point 168. The vertical arm 164 is attached to the horizontal arm 166 at a 90 degree angle. The vertical arm 164 is rotatably coupled to the pivot arm 154 at the pivot point 168, which allows the clamp 156 to pivot on a plane parallel to the pivot arm 154. The horizontal clamp arm 166 contacts or touches the cylindrical tube 152, but is not directly attached to the cylindrical tube 152. When pressure is applied perpendicular to the vertical clamp arm 164, in a direction from the vertical arm 164 towards the cylindrical tube 152, the clamp 156 pivots such that the horizontal arm 166 of the clamp 156 disengages or is directed away from the cylindrical tube 152. This allows an operator to load the intestine product 129 by slipping it over the exterior of the cylindrical tube 152. Disengagement of the clamp 156 further allows the intestine product 129 to be released from the cylindrical tube 158 at the end of the washing process.

The air cylinder 158, shown in FIG. 7, is used to apply pressure to the vertical arm 164, as described above. The air cylinder 158 is used by load cylinder assembly 136 and release cylinder assembly 142, as explained above and shown in FIG. 6, to load and release the intestine product 129 from the cylindrical tube 152. In one embodiment, shown in FIG. 6, the air cylinder 158 is located on the intestine washing wheel 116. However, the air cylinder 158 may also be located externally on a frame or other location that allows it to contact or apply pressure the vertical arm 164 such that clamp 156 pivots and the horizontal arm 166 disengages from the cylindrical tube 152.

When pressure is not being applied to the vertical arm 164 of clamp 156, the contact mechanism 160 applies pressure to the horizontal arm 166. The contact mechanism 160 applies sufficient pressure to the horizontal arm 166 such that intestine product 129 remains attached to the cylindrical tube 152. To maintain this pressure, contact mechanism 160 includes contact button 170 that is spring-loaded. The contact button 170 consistently applies pressure to the horizontal arm 166 of the clamp 156 until the clamp 156 pivots, forcing the spring in the contact button 170 to compress and the horizontal arm 166 to disengage from the cylindrical tube 152.

The attachment bracket 162, shown in FIG. 7, is used to attach the nozzle assembly 128 to one of the nozzle-support arms 130, shown in FIG. 6. The attachment bracket 162 includes a vertical bracket 172 and a horizontal shaft 174. The vertical bracket 172 is attached to and supports both the pivot arm 154 and the contact mechanism 160. The horizontal shaft 174 is rotatably coupled to the nozzle-support arm 130 such that the nozzle assembly 128 is allowed to pivot about an axis parallel to the horizontal shaft 174. In one embodiment, the nozzle assembly 128 maintains a vertical position, wherein the intestine product 129 hangs vertically from the nozzle assembly 128. In other embodiments, the nozzle assembly 128 may pivot and temporarily lock into a horizontal position at the load station 118, shown in FIG. 6, to make it easier for operators to load the intestine product. After the loading process is complete, the nozzle assembly 128 pivots back to the vertical position.

During operation of the rotating intestine system 110, an operator receives intestine product 129 via the loading table 114. The intestine product 129 may already be cut into sections, or the operator may need to cut the intestine 129 into sections. In one embodiment, the operator then activates the load cylinder assembly 136, which disengages the clamp 156 and allows the operator to slide a section of intestine product 129 over the exterior of the cylindrical tube 152. After the intestine product 129 is loaded on the cylindrical tube 152 of the nozzle assembly 128, the operator deactivates the load cylinder assembly 136 and the clamp 156 engages the cylindrical tube 152 and attaches the intestine product 129. In other embodiments, the load cylinder assembly 136 may automatically be activated and deactivated based on timing or location sensors.

Once the intestine product 129 is attached to the nozzle assembly 128, the product 129 is carried to the wash station 120 by rotating the intestine washing wheel 116. This step also allows the operator at the load station 118 to load an additional section of the intestine product 129 onto a subsequent nozzle assembly 128. At the wash station 120, the supply pipe 138 and the external spray assembly 140 are activated, either manually or automatically. This introduces water or cleaning fluid into the interior of the intestine product 129 and over the exterior surface of the product 129. The water introduced by the supply pipe 138 is applied with minimal or no pressure such that gravity is used to carry the water through the interior of the intestine product 129. This process ensures that the mucosa or internal lining of the intestine product 129 is not washed away during the cleaning process.

After the wash station 120, the intestine continues to hang from the nozzle assembly 128 as the intestine washing wheel 116 rotates to the release station 122. During this time, water continues to flow through the interior and over the exterior of the intestine product 129, allowing gravity to assist with the cleaning process, as described above. At the release station, the release cylinder assembly 142 is activated, either manually or automatically, which disengages the clamp 156 from the cylindrical tube 152 of the nozzle assembly 128. The intestine product 129 then drops onto a conveyor or collection box, not shown.

Before another section of intestine 129 is attached to the nozzle assembly 128, the nozzle assembly 128 rotates to the nozzle cleaning station 124, where the nozzle assembly 124 is cleaned. The cleaning spray assembly 144 at the nozzle cleaning station 124 projects a pattern of water onto the cylindrical tube 152 and other components of the nozzle assembly 128, which eliminates any ingesta or fecal matter that may be left on the nozzle assembly 128. The nozzle assembly 128 then rotates back to the load station 118, where the cleaning process starts over.

The rotating washing system 110 of the present invention, in one embodiment, operates at a rate sufficient to clean sections of small intestines at typical commercial chain speeds of a meat processing facility. In one embodiment, the system 110 can keep pace with commercial chain speeds of a meat processing facility. In one embodiment, two or more of the systems 110 are operated in parallel to provide each operator with additional time to attach sections of intestine product 129 to the nozzle assembly 128. In one embodiment, multiple systems 110 operates at a speed sufficient to keep pace with a line operating at about 300 head per hour.

Although the present invention has been described with reference to preferred embodiments, persons skilled in the art will recognize that changes may be made in form and detail without departing from the spirit and scope of the invention.

We claim:

1. A device for cleaning a portion of an animal intestine using a cleaning fluid, the device comprising:
   a carrier adapted to engage and secure the animal intestine and to provide a path to an inner portion of the animal intestine;
   a wheel adapted to raise and support the carrier to an elevation sufficient to allow the animal intestine to hang longitudinally above ground level; and
   supply means for directing the cleaning fluid at the animal intestine.

2. The device of claim 1 wherein the wheel has a central pivot axis and at least two support arms extending from the central pivot axis.

3. The device of claim 2 further comprising a nozzle assembly coupled near a distal end of each support arm.

4. The device of claim 3 wherein the nozzle assembly includes a funnel fluidly coupled to a cylindrical tube, the cylindrical tube sized to insert into the animal intestine.

5. The device of claim 4 wherein the nozzle assembly includes a clamp arm pivotally coupled to the cylindrical tube and a spring adapted to bias the clamp arm toward the cylindrical tube.

6. The device of claim 3 further comprising a loading station adapted to actuate the nozzle assembly.

7. The device of claim 1 wherein the supply means is located above the wheel and comprises a spray assembly adapted to direct a distributed spray of the cleaning fluid onto the animal intestine.

8. A device for cleaning a portion of an inner surface and a portion of an outer surface of an animal intestine using a cleaning fluid, the device comprising:
   a carrier having at least one cylindrical tube adapted to engage and secure the animal intestine and to provide a connection to the inner surface;
   a wheel adapted to rotate about an axis and to raise and support the carrier to an elevation sufficient to allow the animal intestine to hang longitudinally above ground level;
   a spray assembly adapted to direct a distributed spray of the cleaning fluid onto the outer surface of the animal intestine; and
   a supply pipe disposed above the wheel and adapted to direct the cleaning fluid into the connection of the carrier and along the inner surface of the animal intestine.

9. The device of claim 8 wherein the carrier includes a plurality of cylindrical tubes for coupling with a plurality of the intestines.

10. The device of claim 8 wherein the cleaning fluid is water.

11. The device of claim 8 comprising a load table located near a first side of the wheel adapted to support the animal intestines.

12. The device of claim 11 further comprising a container disposed near a second side of the wheel and positioned to accept the intestine after cleaning.

13. The device of claim 8 further comprising a motor adapted to drive the wheel about the axis.

14. The device of claim 8 further comprising a carrier cleaning device located along a bottom side of the wheel for cleaning the carrier prior to attachment of a next intestine.

15. A method of cleaning an interior surface and an exterior surface of an animal intestine, the method comprising:
   attaching the animal intestine to a carrier, the carrier adapted to guide support the animal intestine and to allow access to the interior surface;
   rotating a wheel about an axis to cause rotary motion of the carrier, thereby elevating the carrier until the animal intestine hang vertically above ground level;
   impinging a spray of cleaning fluid onto the exterior surface of the plurality of animal intestines, from a location near the carrier; and
   introducing a flow of cleaning fluid into the interior surface of the plurality of animal intestines through the carrier.

16. The method of claim 15 further including lowering the animal intestine into a container.

17. The method of claim 16 further including releasing the animal intestine near the conclusion of the lowering step.

18. The method of claim 16 further including applying a sinusoidal driving force to the container during the lowering step, such that the plurality of animal intestines enter the container in a serpentine configuration.

19. The method of claim 15 further comprising sanitizing the carrier prior to attaching the animal intestine.

* * * * *